US012162047B2

(12) United States Patent
Broadbent et al.

(10) Patent No.: US 12,162,047 B2
(45) Date of Patent: Dec. 10, 2024

(54) CLEANING SYSTEM AND METHOD

(71) Applicant: Absolute Engineering Limited, Skelmanthorpe (GB)

(72) Inventors: Stephen Broadbent, Skelmanthorpe (GB); Antony Whiteside, Skelmanthorpe (GB)

(73) Assignee: Absolute Engineering Limited, Skelmanthorpe (GB)

( * ) Notice: Subject to any disclaimer, the term of this patent is extended or adjusted under 35 U.S.C. 154(b) by 776 days.

(21) Appl. No.: 17/283,909

(22) PCT Filed: Oct. 9, 2019

(86) PCT No.: PCT/GB2019/052858
§ 371 (c)(1),
(2) Date: Apr. 8, 2021

(87) PCT Pub. No.: WO2020/074890
PCT Pub. Date: Apr. 16, 2020

(65) Prior Publication Data

US 2021/0379632 A1 Dec. 9, 2021

(30) Foreign Application Priority Data

Oct. 9, 2018 (GB) ...................................... 1816441

(51) Int. Cl.
*B08B 7/02* (2006.01)
*B08B 3/04* (2006.01)
*B41F 35/04* (2006.01)

(52) U.S. Cl.
CPC .............. *B08B 7/028* (2013.01); *B08B 3/041* (2013.01); *B41F 35/04* (2013.01)

(58) Field of Classification Search
None
See application file for complete search history.

(56) References Cited

U.S. PATENT DOCUMENTS 4,716,829 A * 1/1988 Wenzel .................... B05D 3/12 134/1
5,058,611 A 10/1991 Liers et al.
(Continued)

FOREIGN PATENT DOCUMENTS

DE 29918488 U1 12/1999
DE 19902957 A1 8/2000
(Continued)

OTHER PUBLICATIONS

DE 19902957 C2 translation, Dosing Device on a Rotary Printing Machine, Scholzig 2003 (Year: 2003).*
(Continued)

*Primary Examiner* — Cristi J Tate-Sims
(74) *Attorney, Agent, or Firm* — Foley & Lardner LLP

(57) ABSTRACT

There is disclosed an ultrasonic cleaning bar for cleaning a roller of a printing machine. The ultrasonic cleaning bar comprises: an elongate body defining a longitudinal axis; a doctor blade supported by the body; an ultrasonic transducer for generating ultrasonic waves within the cleaning fluid; and first and second formations positioned at longitudinally opposite ends of the body, the first formation being releasably engageable with a first mounting bracket of the printing machine and the second formation being releasably engageable with a second mounting bracket of the printing machine; and wherein, when the first and second formations are engaged with the first and second brackets, the doctor blade engages a surface of the roller, such that the body, the doctor blade and the roller define a trough therebetween configured to contain a cleaning fluid which contacts the roller.

26 Claims, 8 Drawing Sheets

(56) References Cited

U.S. PATENT DOCUMENTS

| | | | | |
|---|---|---|---|---|
| 5,240,506 | A | 8/1993 | Liers et al. | |
| 5,291,827 | A | 3/1994 | Liers et al. | |
| 5,842,418 | A | 12/1998 | Corrado et al. | |
| 6,371,024 | B1 | 4/2002 | Scholzig et al. | |
| 6,907,826 | B1 | 6/2005 | Berg et al. | |
| 8,671,506 | B2 | 3/2014 | Steckmann et al. | |
| 2018/0333951 | A1* | 11/2018 | Izaguirre | B41F 5/24 |

FOREIGN PATENT DOCUMENTS

| | | | | | |
|---|---|---|---|---|---|
| DE | 10145902 | A1 | | 4/2003 | |
| DE | 10148401 | A1 | | 4/2003 | |
| EP | 611651 | A1 | * | 8/1994 | B41F 35/00 |
| EP | 0 693 378 | A1 | | 1/1996 | |
| EP | 0 765 749 | A1 | | 4/1997 | |
| EP | 1 097 813 | A2 | | 5/2001 | |
| EP | 1 990 693 | A1 | | 11/2008 | |
| EP | 2 011 653 | B1 | | 1/2009 | |
| FR | 2794402 | | | 12/2000 | |
| GB | 2 346 113 | A | | 8/2000 | |
| GB | 2 417 924 | A | | 3/2006 | |
| JP | 2011-183369 | A | | 9/2011 | |
| WO | WO-2011/072681 | A1 | | 6/2011 | |

OTHER PUBLICATIONS

"SONO The World's First On-Press Ultrasonic Anilox Cleaner," Absolute, Nov. 20, 2019, https://thisissono.com/ 4 pages.

International Search Report and Written Opinion issued for PCT/GB2018/050643, issued May 28, 2018, 15 pages.

International Search Report and Written Opinion issued for PCT/GB2019/052858, issued Apr. 17, 2020, 21 pages.

International Search Report and Written Opinion issued for PCT/GB2021/050860, issued Jul. 12, 2021, 12 pages.

Search Report issued for UK Patent Application No. GB1816441.8, issued Apr. 5, 2019, 5 pages.

Search Report issued for UK Patent Application No. GB1816441.8, issued Jun. 25, 2020, 4 pages.

Search Report issued for UK Patent Application No. GB2005190.0, dated Sep. 21, 2020, 2 pages.

SONO Brochure; Absolute Engineering Ltd. 2018, 2 pages.

* cited by examiner

CLEANING SYSTEM AND METHOD

CROSS-REFERENCE TO RELATED APPLICATIONS

The present application is a National Stage of PCT Application No. PCT/GB2019/052858, filed Oct. 9, 2019, which claims priority from United Kingdom Patent Application No. GB1816441.8, filed Oct. 9, 2018. The contents of these applications are hereby incorporated by reference in their entirety.

The present invention relates to ultrasonic cleaning of a roller of a printing machine. In particular, the present invention relates to an ultrasonic cleaning bar for cleaning a roller of a printing machine, a bracket assembly for mounting an ultrasonic cleaning bar to a printing machine, a roller driver for rotating a roller of a printing machine, a control system for cleaning a roller of a printing machine, and a method for cleaning a roller of a printing machine.

Printing is the process of transferring an image onto a substrate using ink. In gravure printing, a roller engraved with an image to be printed is partially immersed in a quantity of ink and rotated. The ink collects in the engraved parts of the roller. Excess ink is scraped away by a doctor blade as the roller rotates, so that only the ink within the engraved parts of the cylinder remains. Once the excess ink has been scraped away, the roller is brought into contact with a substrate, for example paper. The substrate is typically pressed against the cylinder using a pressure roller positioned on an opposite side of the substrate to the cylinder. The ink contained in the engraved parts of the cylinder is transferred onto the substrate to form the image. In flexographic printing, ink is transferred to a fountain roller by at least partially submerging the fountain roller in a quantity of ink or by using an ink chamber having doctor blades. The fountain roller transfers ink to an anilox roller, which comprises a matrix of identical cells engraved onto its outer surface. As the anilox roller rotates, excess ink is scraped away using a doctor blade such that only the ink within the cells remains. The anilox roller transfers the ink to a print roller, which is engraved with the imaged desired to be printed. The print roller contacts a substrate to transfer the image onto the substrate. Typically, the substrate is typically pressed against the print roller using an impression roller on an opposite side of the substrate to the print roller.

The volume of ink in the engraved parts of the image carrying rollers must be precisely controlled so as to ensure consistent print quality. Over time, however, dried ink builds up within the engraved parts of the rollers. The dried ink acts to reduce the volume of the engraved parts of the rollers, which degrades the quality of the printed image. For example, the printed image may appear fainter, the image may be the wrong colour, or the edges of the printed image may be less precise. It is known to mitigate this problem by cleaning the engraved rollers so as to remove the dried ink. Known cleaning processes require that the engraved roller is removed from the printing machine and immersed in a bath of cleaning fluid containing a surfactant. In some cleaning processes, transducers are used to induce ultrasonic waves within the cleaning fluid which acts to loosen the dried ink from the surface of the engraved roller.

However, removing a roller from a printing machine is a complex task which requires detailed knowledge of the operation of the printing machine and as such can only be performed by skilled workers. The rollers may be up to around 3 m in length and may weigh up to 1 tonne, and thus specialist lifting machinery may be required to remove the roller which adds additional expense to the cleaning process. Furthermore, depending upon the complexity of the printing machine, the amount of down time required to remove a roller to be cleaned may be relatively long, often taking an hour or more. This problem is compounded for full colour printing machines, which typically comprise seven or more rollers that require cleaning. The printing machine cannot be used to generate revenue whilst it is being cleaned, and therefore cleaning of the engraved rollers is relatively expensive in terms of lost revenue. In addition, removing the engraved roller from the printing machine runs the risk that it will be damaged and must therefore be replaced.

It is preferable to empty the bath between each cleaning operation so that subsequent cleaning operations can be performed with fresh cleaning fluid. However, the amount of cleaning fluid contained in the bath is typically significantly greater than the volume of the roller itself. Each cleaning operation therefore consumes a large quantity of cleaning fluid which is environmentally wasteful. Furthermore, because the volume of the bath is relatively large, the ultrasonic waves induced in the cleaning fluid dissipate and lose strength before they are reflected from the surface of the roller being cleaned. As such, the cleaning operation is typically not able to remove all of the dried ink from the roller. The cleaning operation is therefore inefficient in terms of time taken, dissipation of ultrasonic energy and consumption of cleaning fluid.

It is an object of the invention to obviate or mitigate the problems associated with prior art systems for cleaning rollers of printing machines, whether identified herein or elsewhere. It is a further object of the invention to provide an alternative and/or environmentally friendly system for cleaning rollers of printing machines.

According to a first aspect of the invention, there is provided an ultrasonic cleaning bar for cleaning a roller of a printing machine, the ultrasonic cleaning bar comprising: an elongate body defining a longitudinal axis; a doctor blade supported by the body; an ultrasonic transducer for generating ultrasonic waves within the cleaning fluid; and first and second formations positioned at longitudinally opposite ends of the body, the first formation being releasably engageable with a first mounting bracket of the printing machine and the second formation being releasably engageable with a second mounting bracket of the printing machine; and wherein, when the first and second formations are engaged with the first and second brackets, the doctor blade engages a surface of the roller, such that the body, the doctor blade and the roller define a trough therebetween configured to contain a cleaning fluid which contacts the roller.

By "formations" it is meant a mechanical interface between the printing machine and the ultrasonic cleaning bar. For example, the first and second formations may comprise a surface of the ultrasonic cleaning bar. By "releasably engageable" it is meant that the first and second formations are detachable from the first and second brackets. That is to say, the first and second formations are configured to contact the printing machine in a temporary (i.e. non-permanent) manner. For example, the first and second formations may be hooks that are configured to hook onto a frame of the printing machine. Alternatively, the first and second formations may be rails configured to be received within grooves defined by the printing machine. The first and second formations may be "male" formations which are configured to be received by corresponding "female" formations of the printing machine or vice versa.

During normal operation of the printing machine (i.e. when it is printing), the ultrasonic cleaning bar will not be present. When the roller of the printing machine needs cleaning, the printing machine is switched off and the ultrasonic cleaning bar is mounted to the printing machine using the first and second formations. However, because the first and second formations are releasably engageable with the mounting brackets of the printing machine, the connection between the ultrasonic cleaning bar and the printing machine is not permanent. This permits the ultrasonic cleaning bar to be mounted to and removed from the printing machine with ease. In prior art systems, cleaning of the roller requires removal of the roller from the printing machine. However, in the present invention the first and second formations of the ultrasonic cleaning bar permit the ultrasonic cleaning bar to be mounted to the printing machine without removal of the roller. As such, cleaning of the roller can be conducted whilst the roller is disposed in its normal operating position within the printing machine. Because there is no requirement to remove the roller from the printing machine, the amount of time taken to clean the roller is reduced. Furthermore, because the ultrasonic cleaning bar can be mounted to and removed from the printing machine with ease, skilled operators are not required to disassemble components of the printing machine and instead cleaning of the roller can be carried out with unskilled and/or fewer workers. The use of releasable formations for engaging the printing machine therefore reduces the time and cost associated with cleaning the roller.

In addition, it is beneficial if the ultrasonic cleaning bar is able to resonate with the ultrasonic vibrations. Because the ultrasonic cleaning bar of the first aspect of the invention is mounted to the printing machine at its ends, the ultrasonic cleaning bar is free to resonate along its entire length. By contrast, if the ultrasonic cleaning bar were additionally supported at intermediate points along the body, the ultrasonic vibrations would be damped. By supporting the ultrasonic cleaning bar only at its ends, this reduces any damping of the ultrasonic vibrations generated by the ultrasonic transducers and thus provides improved cleaning.

Each of the first and second formations may comprise a protrusion. When the first and second formations comprise protrusions, the first and second formations may be received by channels of the mounting brackets. As such, engagement and disengagement of the first and second formations to the mounting brackets is straightforward. Furthermore, the protrusions may be guided by the channels of the brackets to guide the ultrasonic cleaning bar to the correct position in relation to the roller. As such, the protrusions ensure that the ultrasonic cleaning bar is correctly installed.

Each of the first and second formations may comprise a pin. The pins may be generally circular in cross-section. Because of their circular cross-sections, the pins permit the first and second formations to be received by brackets defining channels which are bent or curved (i.e. not straight). Furthermore, the shape of the pins permits the first and second formations to pivot in relation to the brackets. As such, the ultrasonic cleaning bar can be brought into and out of contact with the roller by pivoting. This is advantageous where the geometry of the printing machine itself dictates that the ultrasonic cleaning bar enters the printing machine along a curved or non-linear path (for example, to account for awkward or tight spaces between components of the printing machine).

The first and second formations may be co-linear and may extend parallel to the longitudinal axis of the ultrasonic cleaning bar. Where the first and second formations are co-linear, this enables the first and second formations to function as a pivot.

The ultrasonic cleaning bar may further comprise a third formation and a fourth formation positioned at longitudinally opposite ends of the body; the first and third formations may be positioned at a first end of the body, and the second and fourth formations may be positioned at a second end of the body, and the third formation may be releasably engageable with the first mounting bracket and the second formation may be releasably engageable with the second mounting bracket.

During use the first and second formations may be received by a first channel of each of the brackets. Once the first and second formations are fully received by the first channels of the brackets, the third and fourth formations may also be partially received within the first channels of the brackets so as to define a resting configuration of the ultrasonic cleaning bar in which it is not engaged with the roller. Subsequently, the ultrasonic cleaning bar may be pivoted about the first and second formations so that the third and fourth formations are received by a second channel of each of the brackets. In this position, the ultrasonic cleaning bar may engage the roller so as to define a cleaning configuration of the ultrasonic cleaning bar.

The third and fourth formations may be co-linear. When the first and second formations are co-linear and the third and fourth formations are also co-linear, the first, second, third and fourth formations will all lie in the same plane. This improves the stability of the ultrasonic cleaning bar when it is engaged with the first and second brackets.

Each of the first and second formations may comprise a channel. Where the first and second formations each comprise a channel, the first and second formations may receive protrusions of the mounting brackets. As such, engagement and disengagement of the first and second formations to the mounting brackets is straightforward. Furthermore, the protrusions of the brackets act to guide the channels of the ultrasonic cleaning bar so that the ultrasonic cleaning bar is in the correct position in relation to the roller. As such, the channels ensure that the ultrasonic cleaning bar is correctly installed relative to the roller and can therefore function correctly (i.e. such that leakage of cleaning fluid does not occur).

The spacing between the ultrasonic transducer and the surface of the roller during use may be no more than 30 mm. Where the ultrasonic transducers are spaced apart from the surface of the roller by no more than 30 mm, the amplitude of the ultrasonic vibrations in the cleaning fluid at the surface of the roller is sufficient to dislodge dried ink and thereby clean the roller. In some embodiments, the spacing between the ultrasonic transducer and the surface of the roller may be no more than 15 mm.

The ultrasonic cleaning bar may further comprise a plurality of ultrasonic transducers spaced apart along the longitudinal axis. Where the ultrasonic cleaning bar comprises a plurality of ultrasonic transducers, the ultrasonic cleaning bar can provide cleaning across the entire length of the roller.

The ultrasonic transducers may be spaced apart from one another by no more than 150 mm. Where the ultrasonic transducers are spaced apart from one another by no more than 150 mm, this ensures that the amplitude of the ultrasonic waves generated in the cleaning fluid is sufficient to provide cleaning across the entire length of the roller. That is to say, blind spots on the roller between adjacent ultrasonic transducers where the amplitude of the ultrasonic vibrations are too small to provide cleaning are avoided. In some embodiments there may be an overlap at the surface of the roller between the ultrasonic waves generated by adjacent transducers. In some embodiments the ultrasonic transducers are spaced apart from one another by no more than 75 mm.

The ultrasonic cleaning bar may further comprise a fluid inlet port and a fluid outlet port. The fluid inlet port enables fresh cleaning fluid to be delivered to the trough and the fluid outlet port enables dirty cleaning fluid to be removed from the trough.

The ultrasonic cleaning bar further may comprise an outlet valve configured to selectively permit fluid flow out of the fluid outlet port. The outlet valve may control the flow of fluid through the trough. The outlet valve may be closed during cleaning so as maintain a constant volume of cleaning fluid in the trough. Because the water in the trough is not flowing, the ultrasonic vibrations are not dampened by any adverse flow effects and therefore cleaning of the roller is improved.

The body may define a base, and the doctor blade may extend from the base to form a generally U-shaped channel. The U-shaped channel may be configured to contain cleaning fluid. Because the channel is U-shaped, the volume of cleaning fluid contained in the channel is relatively small (for example, in comparison to a bath in which the roller of the printing machine may be submerged). Therefore, less cleaning fluid is required and the ultrasonic cleaning bar is more environmentally efficient.

The doctor blade may be a first doctor blade and the ultrasonic cleaning bar may comprise a second doctor blade configured to engage the surface of the roller. The first doctor blade may be positioned on a first side of the body and the second doctor blade may be positioned on a second side of the body opposite the first side of the body.

Where the ultrasonic cleaning bar comprises two doctor blades positioned on opposite sides of the body, the trough of the ultrasonic cleaning bar will be fully enclosed. As such, the ultrasonic cleaning bar can be oriented at substantially any suitable angle in relation to the roller of the printing machine. This is particularly advantageous for preventing fluid leakage where it is necessary to mount the ultrasonic cleaning bar above or below the roller, rather than to the side of the roller.

The ultrasonic cleaning bar may comprise a sensor configured to detect the presence of the cleaning fluid within the trough. The sensor ensures that the ultrasonic transducers are only activated when the trough contains cleaning fluid. This prevents damage to the ultrasonic cleaning bar caused by activating the ultrasonic transducers when the trough is empty.

The sensor may be positioned vertically above the ultrasonic transducer. By "vertically above" it is meant with respect to gravity in relation to the position of the ultrasonic cleaning bar during use. Because the sensor is positioned vertically above the ultrasonic transducer, this ensures that the ultrasonic transducer is below the free surface of the fluid when the fluid is detected by the sensor.

The ultrasonic cleaning bar may further comprise an arm configured to connect to a frame of the printing machine so as to hold the ultrasonic cleaning bar in a cleaning position in relation to the roller. The arm may, for example, be configured to abut a portion of the printing machine in order to hold the ultrasonic cleaning bar in the cleaning position. Additionally or alternatively, the arm may be configured to be held against the frame of the printing machine by latching.

The ultrasonic cleaning bar may comprise a power line for connecting the ultrasonic transducer to a control unit. For example, the control unit may comprise a pulse generator configured to generate an oscillating electrical current which causes the ultrasonic transducers to produce ultrasonic vibrations at a desired frequency. The power line therefore provides a means of transmitting the oscillating electrical current to the ultrasonic transducers.

The power line may comprise a plug configured to connect to the control unit, the plug being configured to selectively draw an amount of power from the control unit which corresponds to the number of ultrasonic transducers of the ultrasonic cleaning bar. For example, the ultrasonic cleaning bar may comprise a plurality of ultrasonic transducers, the total number of ultrasonic transducers being dependent upon the length of the ultrasonic cleaning bar. Because the plug is configured to selectively draw an amount of power which corresponds to the number of ultrasonic transducers, the plug protects the ultrasonic transducers from being overloaded and/or ensures enough power can be drawn to provide sufficient power to the transducers.

According to a second aspect of the invention there is provided an ultrasonic cleaning bar bracket assembly for a printing machine, wherein the bracket assembly comprises first and second brackets for mounting either end of a roller, wherein each bracket comprises a first formation and a second formation, the first and second formations being configured to releasably engage corresponding formations of the ultrasonic cleaning bar.

It will be appreciated that the term "releasably engageable" has the same meaning as set out above in relation to the first aspect of the invention. Because the first and second formations of the first and second brackets are releasably engageable with the ultrasonic cleaning bar, the bracket assembly provides a fast and straightforward way of mounting and dismounting the ultrasonic cleaning bar from the printing machine. It will be appreciated that the ultrasonic cleaning bar and the bracket assembly thereby work in conjunction with one another to enable the ultrasonic cleaning bar to be released from the printing machine. In particular, the first formation of the first bracket may be configured to engage a first formation of the ultrasonic cleaning bar; the first formation of the second bracket may be configured to engage a second formation of the ultrasonic cleaning bar; the second formation of the first bracket may be configured to engage a third formation of the ultrasonic cleaning bar; and the second formation of the second bracket may be configured to engaged a fourth formation of the ultrasonic cleaning bar.

The first and second formations of the second bracket may be a mirror image of the first and second formations of the first bracket. That is to say, the first formation of the second bracket is a reflection of the first formation of the first bracket, and the second formation of the second bracket is a reflection of the second formation of the second bracket. The plane of reflection may be a plane perpendicular to a longitudinal axis of the cleaning bar. During use, the first bracket may be mounted at one end of the roller and the second bracket may be mounted at the other end of the roller. Because the formations of the brackets are reflections of one another, this means that the ultrasonic cleaning bar is supported in the same manner at either end, thereby simplifying the mounting and dismounting process.

The first formation of each bracket may define an upper channel and the second formation of each bracket may define a lower channel, each of the upper and lower channels being configured to receive a corresponding protrusion of the ultrasonic cleaning bar. The channels act to guide the protrusions of the ultrasonic cleaning bar into position so that the ultrasonic cleaning bar is in the correct configuration in relation to the roller. The corresponding protrusions of the ultrasonic cleaning bar may be, for example, a plurality of pins.

The upper and lower channels may define a generally U-shaped recess having a neck through which the formations of the ultrasonic cleaning bar are received. The necks of the U-shaped recesses receive the corresponding formations of the ultrasonic cleaning bar as the ultrasonic cleaning bar is mounted to the brackets. The U-shaped recess connects both the upper and lower channels and therefore allows one or more of the formations of the ultrasonic cleaning bar to move between the upper and lower channels. For example, the ultrasonic cleaning bar may comprise a pair of pins at either end of the ultrasonic cleaning bar. During use, the user inserts a lower pair of the pins in to the lower channels of the brackets. An upper pair of the pins may be spaced from the lower pins by an amount such that, once the lower pins have been fully received by the lower channel, the upper pins are also received by the first channel so that the ultrasonic cleaning bar is resting away from the roller. The ultrasonic cleaning bar can then be pivoted about the lower pins, to move the upper pins through the neck of the U-shaped recess and into the upper channels of the brackets so that the ultrasonic cleaning bar engages the roller. In this way, the U-shaped configuration of the channels determines the relative positions of a resting configuration and a cleaning configuration of the ultrasonic cleaning bar.

The upper and lower channels may define end faces configured to engage the corresponding formations of the ultrasonic cleaning bar. The end faces may delimit the terminal ends of the upper and lower channels, thereby acting as stops to prevent movement of the ultrasonic cleaning bar. As such, the end faces ensure that the ultrasonic cleaning bar is received in the correct position in relation to the roller.

The end faces of the upper and lower channels may be generally parallel to a longitudinal axis of the ultrasonic cleaning bar, and each of the first and second brackets may further comprise a front surface perpendicular to the longitudinal axis of the ultrasonic cleaning bar. Where the front surfaces are perpendicular to the longitudinal axis of the ultrasonic cleaning bar, the front surfaces limit movement of the ultrasonic cleaning bar in a direction parallel to the longitudinal axis. Furthermore, because the end faces are generally parallel to the longitudinal axis of the roller, the ultrasonic cleaning bar engages the end faces in a direction perpendicular to the longitudinal axis of the bar. As such, the ultrasonic cleaning bar is constrained in all directions except the direction of mounting, which is perpendicular to the longitudinal axis. This may permit straightforward and fast mounting and dismounting of the ultrasonic cleaning bar to the brackets.

The first and second brackets may each comprise a through hole for receiving a fastener. The through holes may be countersunk. The fasteners may be used to mount the bracket to the printing machine and thereby position the brackets and the ultrasonic cleaning bar in the correct position in relation to the roller. Where the through holes are countersunk this ensures correct centring of the bracket relative to the printing machine, so that the ultrasonic cleaning bar is in the correct position once mounted to the brackets.

According to a third aspect of the invention there is provided a control unit for an ultrasonic cleaning system, the control unit comprising: a housing, a fluid outlet for supplying cleaning fluid to an ultrasonic cleaning bar separate to the control unit, an electrical outlet for supplying electricity to the ultrasonic cleaning bar; a pulse generator for providing an oscillating electrical current to the electrical outlet; and a controller configured to control the pulse generator and the supply of cleaning fluid via the fluid outlet.

The oscillating electrical current generated by the pulse generator may be supplied to the ultrasonic cleaning bar by the electrical outlet. In particular, the ultrasonic cleaning bar may be connected to the electrical outlet by a power cable. The oscillating electrical current is used to power one or more ultrasonic transducers of the ultrasonic cleaning bar. Because the pulse generator is part of the control unit and not the ultrasonic cleaning bar the size of the ultrasonic cleaning bar can be reduced, making the ultrasonic cleaning bar easier to install. Furthermore, some cleaning systems may comprise more than one ultrasonic cleaning bar. Because the pulse generator is part of the control unit, only one pulse generator is required for multiple ultrasonic cleaning bars, thus saving cost. The frequency of the oscillating current produced by the pulse generator will determine the frequency of the ultrasonic vibrations produced by the ultrasonic transducers. Because the controller controls the pulse generator, the controller can activate and deactivate the pulse generator and/or can adjust the frequency of the oscillating current generated by the pulse generator. Furthermore, because the controller controls the supply of cleaning fluid to the fluid outlet and hence the ultrasonic cleaning bar, the controller can thereby ensure that the ultrasonic transducers are only activated when the ultrasonic cleaning bar is supplied with cleaning fluid. As such, the controller is able to prevent damage caused by activating the ultrasonic transducers when the ultrasonic cleaning bar is empty. The controller may control the flow of fluid to the ultrasonic cleaning bar by selectively actuating a valve or a pump or the like. In some embodiments, the ultrasonic cleaning bar may comprise a remotely actuable valve, and the controller may communicate with the valve of the ultrasonic cleaning bar via the electrical outlet of the housing.

The control unit may comprise a valve configured to permit or restrict flow through the fluid outlet, the valve being controllable by the controller. Where the valve is controllable by the controller, the controller can permit or restrict flow to the ultrasonic cleaning bar.

The control unit may comprise a dosing unit configured to introduce a surfactant into the cleaning fluid. The dosing unit may permit a surfactant, such as a detergent, to be introduced into the cleaning fluid to enhance the cleaning effect. The surfactant encourages dried ink on the roller of the printing machine to break free and/or be carried by the cleaning fluid.

The control unit may comprise a heater configured to heat the cleaning fluid. It has been found that by heating the cleaning fluid, the cleaning effect of the cleaning fluid, and hence the ultrasonic cleaning bar, is improved. As such, the heater ensures that the cleaning fluid is at the correct temperature for optimum cleaning. For example, the heater may comprise an in-line heater configured to heat a flow of fluid, or the heater may comprise a tank having heating elements, the tank being configured to heat a stationary body of fluid.

The housing may comprise a door for accessing the dosing unit. The door allows a user to replenish used surfactant.

The control unit may comprise a fluid inlet port configured to receive fluid from a fluid supply. The fluid supply may be, for example, a factory water supply. The fluid pressure of the factory water supply may drive the flow of fluid to the ultrasonic cleaning bar (and, where appropriate, through the heater and the dosing unit to the fluid outlet). In alternative embodiments, the control unit may comprise a fluid tank containing the cleaning fluid.

The control unit may comprise a user input panel in communication with the controller. The user input panel provides a means for the user to adjust the parameters controlled by the controller. For example, the user input panel may comprise one or more buttons and/or may comprise a screen or a touch screen displaying a graphical user interface. The user input may communicate with the controller in any suitable manner, such as for example direct electrical communication or wireless communication or the like.

The controller may be configured to communicate with a roller driver. The roller driver may be used to control the rotation of the roller of the printing machine during cleaning. Because the controller is in communication with the roller driver, the controller can activate or deactivate the roller driver and/or control the speed of the roller driver. This may enable optimized cleaning of the roller. The roller driver may communicate with the controller via any suitable means, such as for example by direct electrical communication or by wireless communication or the like.

The control unit may comprise an electrical outlet for supplying electricity to the roller driver. The control unit may therefore act as a power supply for the roller driver. As such, the roller driver will not require an internal power supply or a power supply separate to the control unit, and therefore the roller driver can be more compact.

The control unit may comprise a plurality of fluid outlets for supplying cleaning fluid to separate respective ultrasonic cleaning bars, and a plurality of electrical outlets for supplying electricity to each of the separate respective ultrasonic cleaning bars. Where the control unit comprises a plurality of electrical and fluid outlets, the control unit may be used to control a plurality of different ultrasonic cleaning bars. As such, a first ultrasonic cleaning bar can be used to clean a first roller of a printing machine whilst a second ultrasonic cleaning bar is assembled to a second roller of the same or a different printing machine. Whilst the first roller is being cleaned or once cleaning of the first roller is complete, the second ultrasonic cleaning bar is activated so as to clean the second roller. Whilst the second roller is being cleaned, the first ultrasonic cleaning bar may be dismounted from the first roller and mounted to a third roller, ready for cleaning. As such, the use of multiple ultrasonic cleaning bars saves time where multiple rollers are to be cleaned. This is particularly advantageous for example within full colour printing machines.

According to a fourth aspect of the invention, there is provide a roller driver for rotating a roller of a printing machine during cleaning with an ultrasonic cleaning bar, the roller driver comprising: a mounting for attaching the roller driver to the printing machine; a motor; and a wheel drivable by the motor, the wheel defining an outer surface configured to frictionally engage the roller of the printing machine.

It will be appreciated that the roller driver is separate to and distinct from a drive mechanism of the printing machine configured to rotate the roller during printing. The roller driver enables the roller to be rotated without the need to drive the other rollers of the printing machine. Because the wheel of the roller driver frictionally engages the roller of the printing machine, the wheel imparts rotational motion to the roller. In particular, the outer surface of the wheel will engage an outer surface of the roller. Due to the frictional engagement, at the point at which the outer surface of the wheel engages the outer surface of the roller, the two surfaces will have the same velocity. Therefore, the roller driver is able to impart a constant surface velocity to the roller, regardless of the diameter of the roller. By contrast, in systems where an axle of the roller is driven, the velocity of the outer surface of the roller will increase as the diameter of the roller increases. If the velocity of the outer surface of the roller is too fast, the cleaning efficiency of the ultrasonic cleaning bar will be reduced. The roller driver of the present invention improves control over the surface velocity of the roller and avoids the need to adjust the parameters of the cleaning system when the size of the roller has been changed.

The outer surface of the wheel may comprise a polymer. The roller may be for example an engraved roller comprising one or more cells for containing ink (e.g. an anilox roller). Typically the roller of the printing machine will be made of metal. Should the engraved cells of the roller become damaged, for example by scratching, ink may run from the cells and degrade the quality of the printed image. However, because polymers are, in general, softer than metals, the outer surface of the wheel is soft enough so as not to damage the roller. Furthermore, the use of polymer for the outer surface of the wheel provides good frictional contact between the wheel and the roller, so as to ensure the roller does not slip when being driven by the wheel. The polymer may, for example, be a rubber. In particular, the polymer may be a 60 shore rubber.

The motor may be configured to communicate with a control unit for an ultrasonic cleaning system. Such communication may be, for example, direct electronic communication or wireless communication. Because the motor can communicate with the control unit, the control unit can be used to adjust the operating parameters of the drive roller, such as, for example, by activating or deactivating the drive roller or adjusting the speed of the wheel.

According to a fifth aspect of the invention, there is provide a printing machine cleaning system, comprising: an ultrasonic cleaning bar; a bracket assembly for mounting the ultrasonic cleaning bar to the printing machine, wherein the ultrasonic cleaning bar is releasably engageable with the bracket assembly; and a control unit fluidly and electrically connected to the ultrasonic cleaning bar, the control unit being configured to control the supply of a cleaning fluid to the ultrasonic cleaning bar and comprising a pulse generator configured to supply an oscillating electrical current to the ultrasonic cleaning bar for driving an ultrasonic transducer of the ultrasonic cleaning bar.

The ultrasonic cleaning bar may be an ultrasonic cleaning bar according to the first aspect of the invention. The bracket assembly may be a bracket assembly according to the second aspect of the invention. The control unit may be a control unit according to the third aspect of the invention.

The system may further comprise a roller driver configured to engage an outer surface of the roller, the control unit being configured to communicate with the roller driver. The roller driver may be a roller driver according to the fourth aspect of the invention. The control unit may further comprise a controller configured to control the pulse generator. In addition, the controller may control a motor of the roller driver.

According to a sixth aspect of the invention there is provided a method of cleaning a roller of a printing machine, the method comprising: attaching a pair of brackets to the printing machine either end of the roller; engaging an ultrasonic cleaning bar with the brackets at either end of the ultrasonic cleaning bar; engaging the ultrasonic cleaning bar with an outer surface of the roller; providing cleaning fluid to a trough of the ultrasonic cleaning bar; and generating ultrasonic vibrations within the cleaning fluid to clean the outer surface of the roller.

In particular, the brackets may be mounted to the printing machine before the ultrasonic cleaning bar is mounted to the brackets. Because the brackets are mounted to the printing machine before the ultrasonic cleaning bar is mounted to the brackets, mounting of the ultrasonic cleaning bar to the printing machine is straightforward and fast. As such, installation of the ultrasonic cleaning bar can be carried out by a single operator and does not require skilled workers or contactors. Because the ultrasonic cleaning bar engages the surface of the roller, the ultrasonic cleaning bar is in close proximity to the roller. As such, the amplitude of the ultrasonic oscillations at the outer surface of the roller is improved, and therefore more dried ink can be removed from the roller.

The method may further comprise: engaging a wheel of a roller driver with the outer surface of the roller; and transferring rotational motion from the wheel to the roller so as to cause rotation of the roller relative to the ultrasonic cleaning bar.

These steps may occur at the same time as the step of generating ultrasonic vibrations within the cleaning fluid to clean the outer surface of the roller. As such, this ensures that the entire outer surface of the roller is cleaned.

The method may further comprise detecting the presence of the cleaning fluid within the trough of the ultrasonic cleaning bar using a sensor. The step of generating ultrasonic vibrations within the cleaning fluid may occur after the step of detecting the presence of cleaning fluid within the trough of the ultrasonic cleaning bar using a sensor so as to prevent ultrasonic vibrations being generated when cleaning fluid is not present in the trough and thereby prevent damage caused by the ultrasonic vibrations.

The method may further comprise disengaging the ultrasonic cleaning bar from the brackets.

The method may comprise introducing a surfactant to the cleaning fluid. The surfactant aids in the removal of dried ink from the roller and/or aids the cleaning fluid to carry the ink.

The method may comprise heating the cleaning fluid. It has been found that heated fluid improves the cleaning of the roller.

The method may further comprise attaching a second pair of brackets to a printing machine either end of a second roller. Once cleaning of the first roller is complete, the ultrasonic cleaning bar may be engaged with the second brackets to clean the second roller.

The method may further comprise: engaging a second ultrasonic cleaning bar with the second pair of brackets at either end of the second ultrasonic cleaning bar; engaging the second ultrasonic cleaning bar with an outer surface of the second roller; providing fluid to a trough of the second ultrasonic cleaning bar; and generating ultrasonic vibrations within the cleaning fluid to clean the outer surface of the roller. The roller may be a first roller and the ultrasonic cleaning bar may be a first ultrasonic cleaning bar. The steps of "attaching a second pair of brackets to the printing machine either side of a second roller" and "engaging a second ultrasonic cleaning bar with the second pair of brackets at either end of the second ultrasonic cleaning bar" may occur at the same time as the step of "generating ultrasonic vibrations within the cleaning fluid to clean the outer surface of the roller" in relation to the first roller.

The features of the first, second, third, and fourth aspects of the invention may be combined with the features of the fifth aspect of the invention so as to provide the same or additional advantages.

Embodiments of the invention will now be described, by way of example only, with reference to the accompanying schematic drawings, in which.

Figure 1:
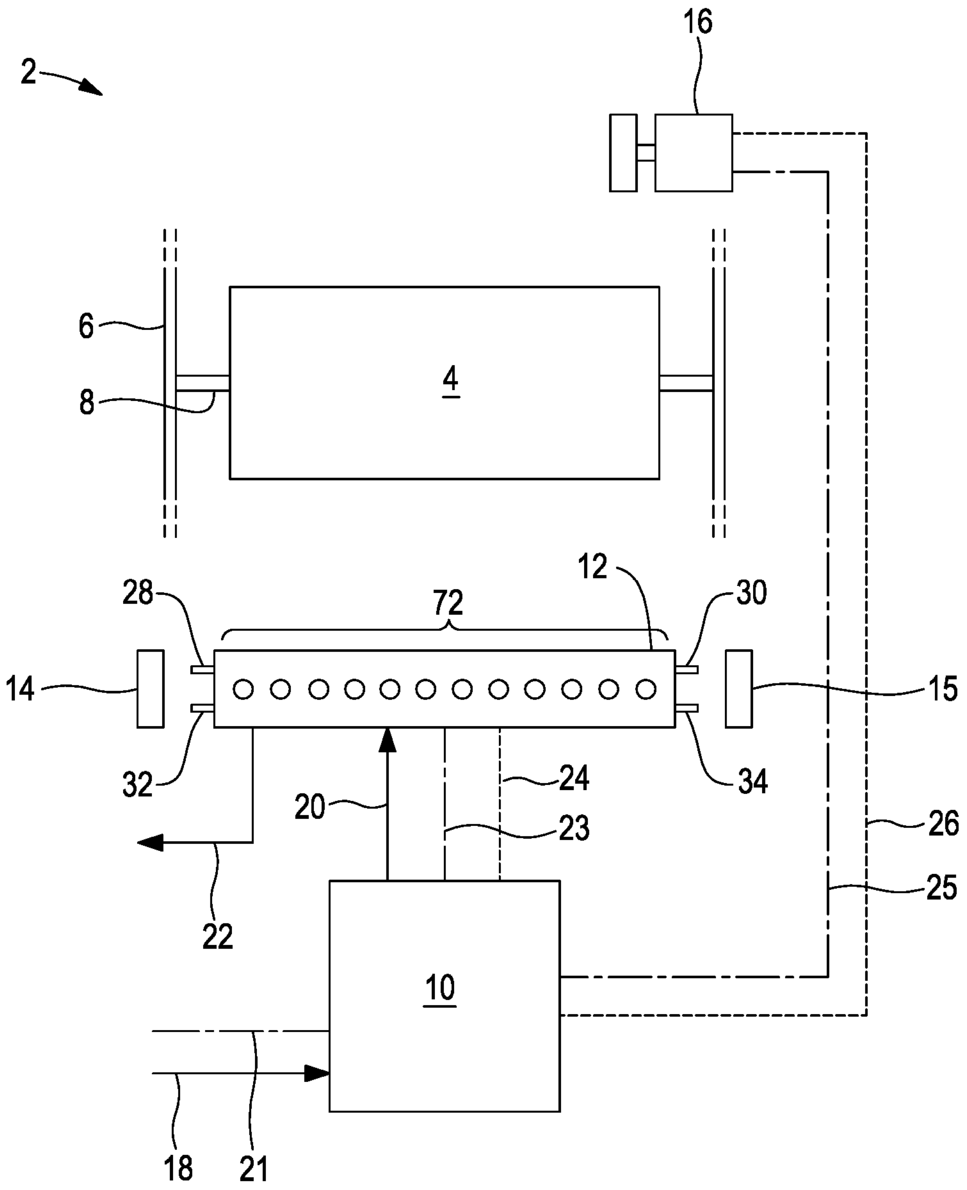
FIG. 1 is a schematic representation of a cleaning system in accordance with the present invention.

FIG. 1 shows a cleaning system 2 for cleaning a roller 4 of a printing machine 6. The print roller may be, for example, an engraved roller, and in particular may be an anilox roller. The print roller 4 comprises an axle 8 configured to support the print roller 4 for rotation. The cleaning system 2 comprises a control unit 10, an ultrasonic cleaning bar 12, a first bracket 14, a second bracket 15 and a roller driver 16. The ultrasonic cleaning bar 12 comprises a plurality of ultrasonic transducers 72 configured to generate ultrasonic vibrations. The control unit 10 receives fluid from a first fluid line 18 and dispenses fluid from a second fluid line 20. The first fluid line 18 is connected to a fluid source, such as, for example, a factory water supply. The ultrasonic cleaning bar 12 receives fluid from the second fluid line 20 and dispenses fluid from a third fluid line 22. The third fluid line 22 removes waste fluid from the ultrasonic cleaning bar 12, and is typically connected to a drain or a factory waste disposal system.

The control unit 10 is connected to an electrical power source by a first power line 21. The ultrasonic cleaning bar 12 is connected to the control unit 10 by a second power line 23 so as to supply electrical power to the ultrasonic cleaning bar 12. The ultrasonic cleaning bar 12 is further connected to the control unit 10 by a first communications line 24 so that the ultrasonic cleaning bar 12 and the control unit 10 may send and receive control signals therebetween. The control unit 10 is connected to the roller driver 16 by a third power line 25 so as to supply electrical power to the roller driver 16. The control unit 10 is further connected to the roller driver 16 by a second communications line 26 so that the roller driver 16 and the control unit 10 may send and receive control signals therebetween. In the illustrated embodiment the control signals sent between the control unit 10, ultrasonic cleaning bar 12 and roller driver 16 are electrical control signals, however the control signals may additionally or alternatively comprise optical or wireless control signals.

Figure 2:
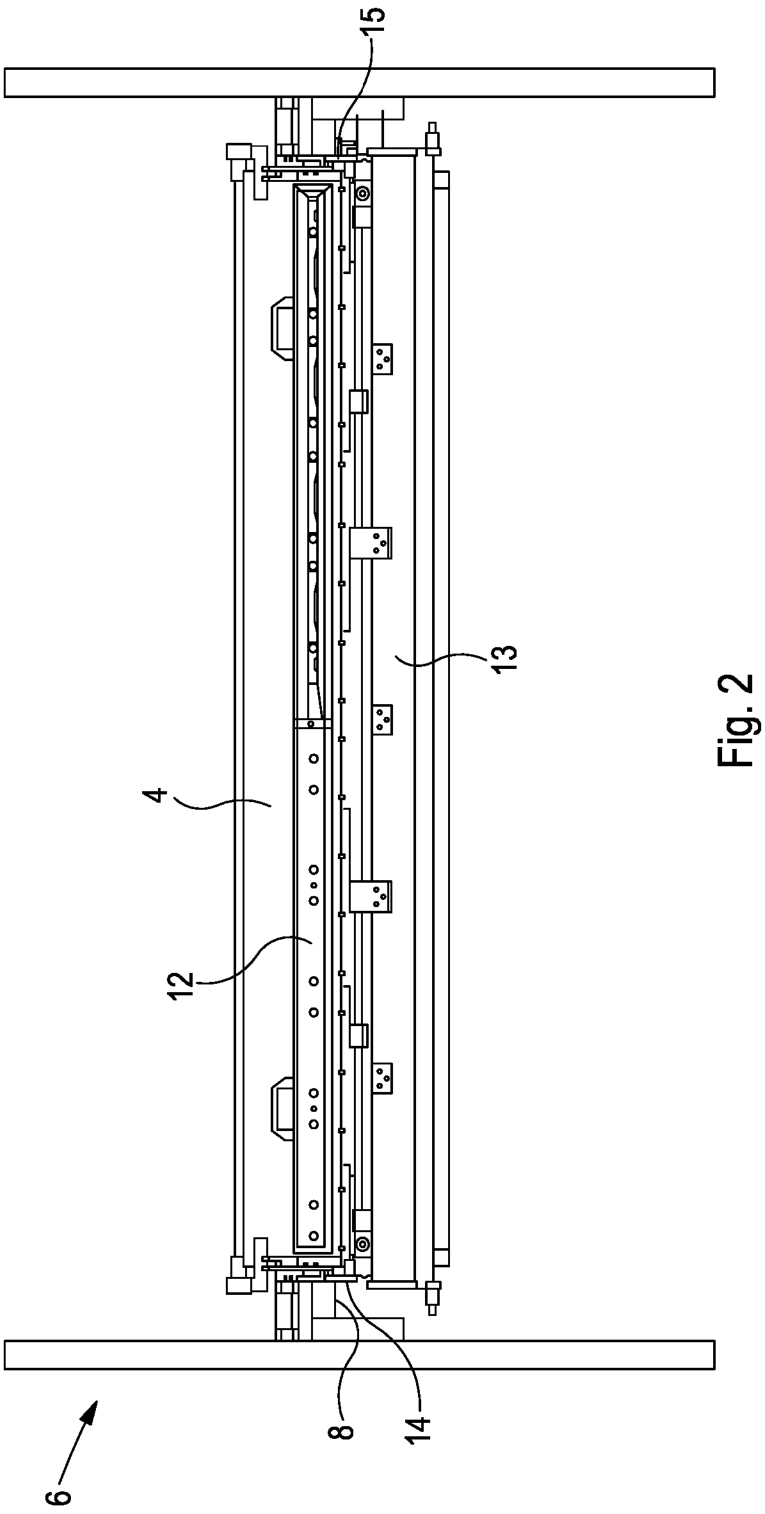
FIG. 2 is a front view of an ultrasonic cleaning bar according to the present invention mounted to a portion of a printing machine.

FIG. 2 shows a side view of the ultrasonic cleaning bar 12 in an assembled state within a printing machine 6. The ultrasonic cleaning bar 12 is generally elongate and defines a longitudinal axis extending generally parallel to the axle 8 of the roller 4. The printing machine 6 further comprises an ink chamber 13. The ink chamber 13 is pivotally mounted within the printing machine 6 so that it can be moved into and out of contact with the roller 4. In the position shown in FIG. 2, the ink chamber 13 has been pivoted away from the roller 4. However, in normal use the ink chamber 13 engages the roller 4 in approximately the same position as the position of the ultrasonic cleaning bar 12 shown in FIG. 2.

With reference to FIG. 1, the ultrasonic cleaning bar 12 comprises a first pin 28, a second pin 30, a third pin 32 and a fourth pin 34. The first and second pins 28, 30 are co-linear and are positioned at longitudinally opposite ends of the ultrasonic cleaning bar 12. Likewise, the third and fourth pins 32, 34 are co-linear and are positioned at longitudinally opposite ends of the ultrasonic cleaning bar 12. The first and second pins 28, 30 are spaced apart from the third and fourth pins 32, 34 in a lateral direction perpendicular to a longitudinal axis of the ultrasonic cleaning bar 12. The first pin 28 and the third pin 32 are configured to be received by the first bracket 14. The second pin 30 and the fourth pin 34 are configured to be received by the second bracket 15. The first and second brackets 14, 15 are mountable to the printing machine 6 either side of the roller 4.

Figure 3:
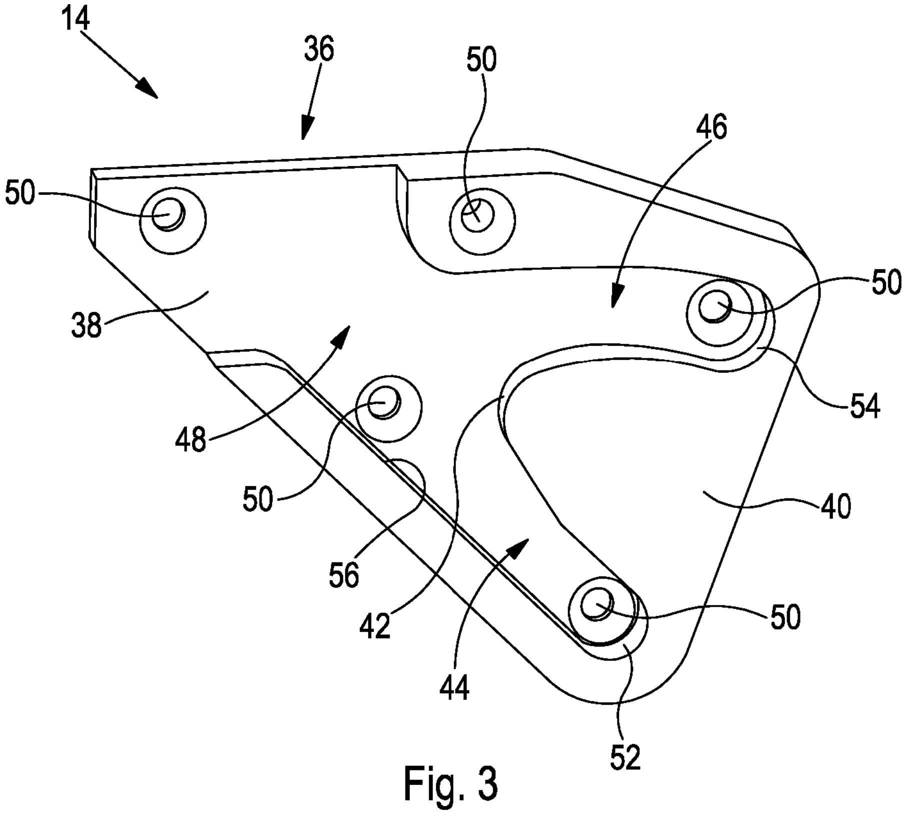
FIG. 3 is a perspective view of a bracket according to the present invention for mounting an ultrasonic cleaning bar to a printing machine.

FIG. 3 shows a perspective view of the first bracket 14. The bracket 14 comprises a rear surface 36, a front surface 38 and a raised surface 40 which are generally co-planar. The front surface 38 and the raised surface 40 are connected by a guide surface 42 which extends in a normal direction relative to the front and raised surfaces 38, 40. The front surface 38, raised surface 40 and guide surface 42 co-operate to define a lower channel 44, an upper channel 46 and a neck region 48. The lower channel 44 terminates in a lower end face 52 defined by the guide surface 42, and the upper channel 46 terminates in an upper end face 54 also defined by the guide surface 42. The lower channel 44 and upper channel 46 are connected by the neck region 48, such that the lower channel 44 and upper channel 46 form a generally U-shaped recess relative to the raised surface 40. The lower channel 44 defines a sloping portion 52 of the guide surface 42 which extends from the neck 48 to the lower end face 52.

The bracket 14 comprises a plurality of mounting holes 50 which are configured to receive fasteners for securing the mounting bracket to a frame of the printing machine 6. The mounting holes 50 comprise countersunk openings configured to receive corresponding countersunk screws, which ensures correct centring of the bracket relative to the frame of the printing machine 6. Different models of printing machine 6 have different frame geometries, and therefore the exact positions of the mounting holes 50 may be chosen in dependence upon the geometry of the printing machine 6.

The second bracket 15 is substantially identical to the first bracket 14, but is mirrored in a plane defined by the raised surface 40. The first and second brackets 14, 15 are mounted to a frame of the printing machine 6 either side of the roller 4. In particular, the brackets 14, 15 are mounted such that the lower and upper channels 44, 46 face generally towards the roller 4 whilst the necks 48 face generally away from the roller 4. During use, the user orients the ultrasonic cleaning bar 12 so that its longitudinal axis extends generally parallel to the axle 8 of the roller 4. The user then slides the third and fourth pins 32, 34 through the necks 48 of the brackets 14, 15 and into the lower channels 44 until the second and fourth pins 32, 34 engage the lower end faces 52. In this position, the first and second pins 28, 30 rest upon the sloping portions 56 of the brackets 14, 15. In this position, the ultrasonic cleaning bar 12 is held in a resting configuration by the brackets 14, 15 in which the ultrasonic cleaning bar 12 is supported by the printing machine 6 but is not in contact with the roller 4. The user then pivots the ultrasonic cleaning bar 12 about the third and fourth pins 32, 34 such that the first and second pins 28, 30 are received within the upper channels 46 and contact the upper end faces 54. In this position, the ultrasonic cleaning bar 12 is held in a cleaning configuration by the brackets 14, 15 in which the ultrasonic cleaning bar 12 engages the roller 4.

The lower and upper channels 44, 46 act to guide the ultrasonic cleaning bar 12 into the resting and cleaning configurations and therefore assist the user when mounting the ultrasonic cleaning bar 12 to the printing machine 6. In particular, the geometries of the lower and upper channels 44, 46 prevent the ultrasonic cleaning bar 12 from being fitted incorrectly. Fitting and removal of the ultrasonic cleaning bar 12 from the printing machine 6 using the brackets 14, 15 is therefore simple and fast. Due to their relatively small size, the brackets 14, 15 may be left in place within the printing machine 6 when the ultrasonic cleaning bar 12 has been removed so as to save time during the next cleaning operation.

Figure 4:
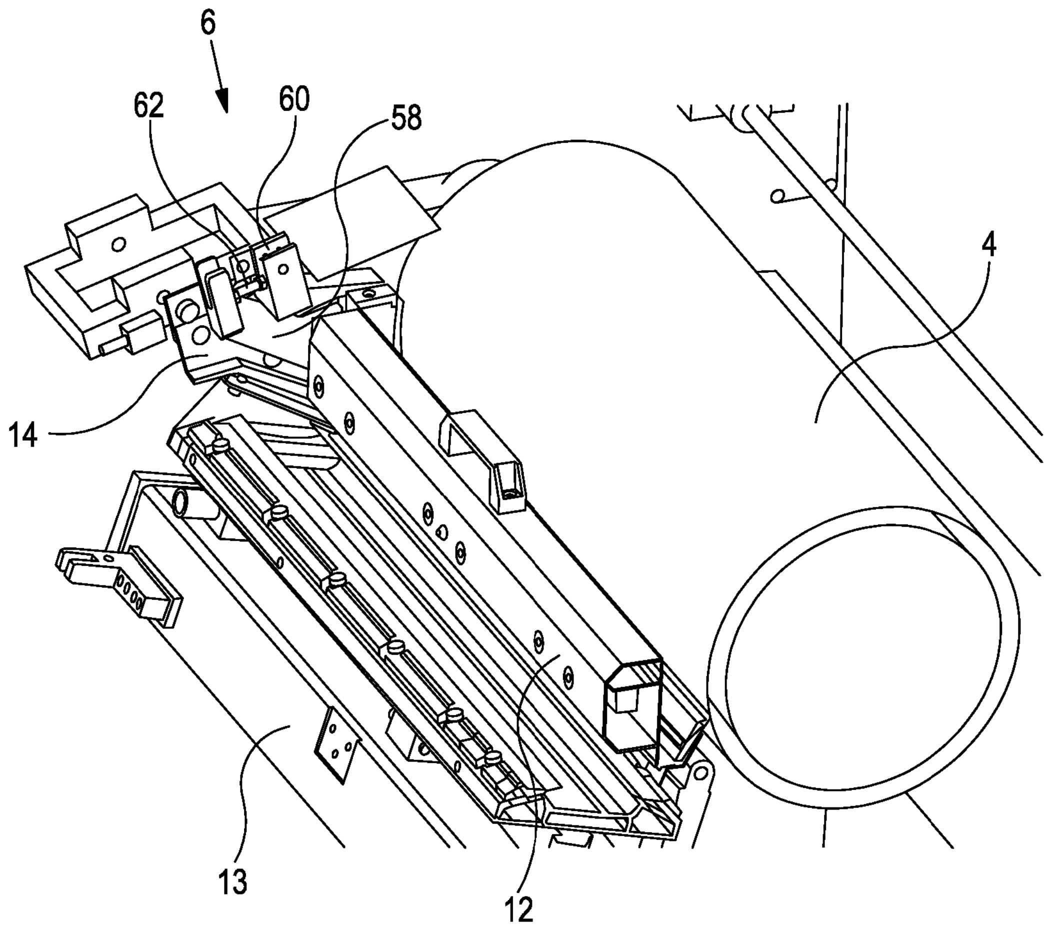
FIG. 4 is a perspective cross-sectional view of an ultrasonic cleaning bar according to the present invention mounted to a portion of a printing machine.

FIG. 4 shows a perspective cross-sectional view of the ultrasonic cleaning bar 12 mounted within the printing machine 6. The ultrasonic cleaning bar 12 further comprises a pair of arms 58 at either end of the ultrasonic printing bar 12 (only one arm 58 is shown in FIG. 4). The arms 58 are configured to engage a frame 60 of the printing machine 6. It will be appreciated that different models of printing machine 6 will have different frame geometries, and therefore the specific shape of the arms 58 will be dependent upon the model of printing machine 6. In the illustrated embodiment, the printing machine 6 is a Gopfert Evolution. Each arm 58 comprises a bolt 62 extending from an end of the arm 58, the bolt 62 being configured to act as a catch to receive a corresponding latch of the printing machine 6. During use, when the ultrasonic cleaning bar 12 is pivoted from the resting configuration to the cleaning configuration, the latch of the printing machine 6 engages the bolt 62 of the arm 58 to hold the ultrasonic cleaning bar 12 in the cleaning configuration. The arm 58 therefore prevents accidental pivoting of the ultrasonic cleaning bar 12 out of the cleaning configuration.

The brackets 14, 15 are manufactured as single integral piece and in particular are manufactured from a polymer such as nylon, polyurethane, polytetrafluoroethylene, or the like. However, it will be appreciated that the brackets 14, 15 may be manufactured from any suitable material. In alternative embodiment, the brackets 14, 15 may not be made from a single integral piece. For example, the rear surface 36 and front surface 38 may be manufactured from a single flat plate, and the raised surface 40 and the guide surface 42 may be manufactured from a block of material that is subsequently attached to the flat plate.

Although the ultrasonic cleaning bar 12 described above comprises pins 28, 30, 32, 34 which engage the brackets 14, 15, it will be appreciated that in alternative embodiments the ultrasonic cleaning bar 12 may comprise substantially any formation which is able to engage the brackets 14, 15 so as to hold the ultrasonic cleaning bar 12 in the cleaning or resting configuration. For example, such formations may comprise rails configured to be received within grooves. Furthermore, in some embodiments the brackets 14, 15 may be replaced with pins, and the pins 28, 30, 32, 34 of the ultrasonic cleaning bar 12 may be replaced with geometry equivalent to the brackets 14, 15 of the embodiment described above. That is to say, the printing machine may comprise a "male" formation and the ultrasonic cleaning bar may comprise a "female" formation configured to receive the "male" formation.

The ultrasonic cleaning bar 12 may comprise one or more switches configured to detect when the ultrasonic cleaning bar has been mounted to the brackets. For example, a switch may be positioned on one the end of the ultrasonic cleaning bar 12 adjacent one of the formations. The switch may be positioned such that the switch is actuated when the ultrasonic cleaning bar 12 is received by the brackets 14, 15 in the cleaning configuration. The switch may communicate with the control unit 10, and the control unit 10 may be configured to prevent the ultrasonic transducers 72 from being activated and/or the trough 82 from being filled when the switch is not actuated. As such, the switches ensure that the ultrasonic cleaning bar is only filled with cleaning fluid when it is in the correct position in relation to the roller 4.

Figure 5:
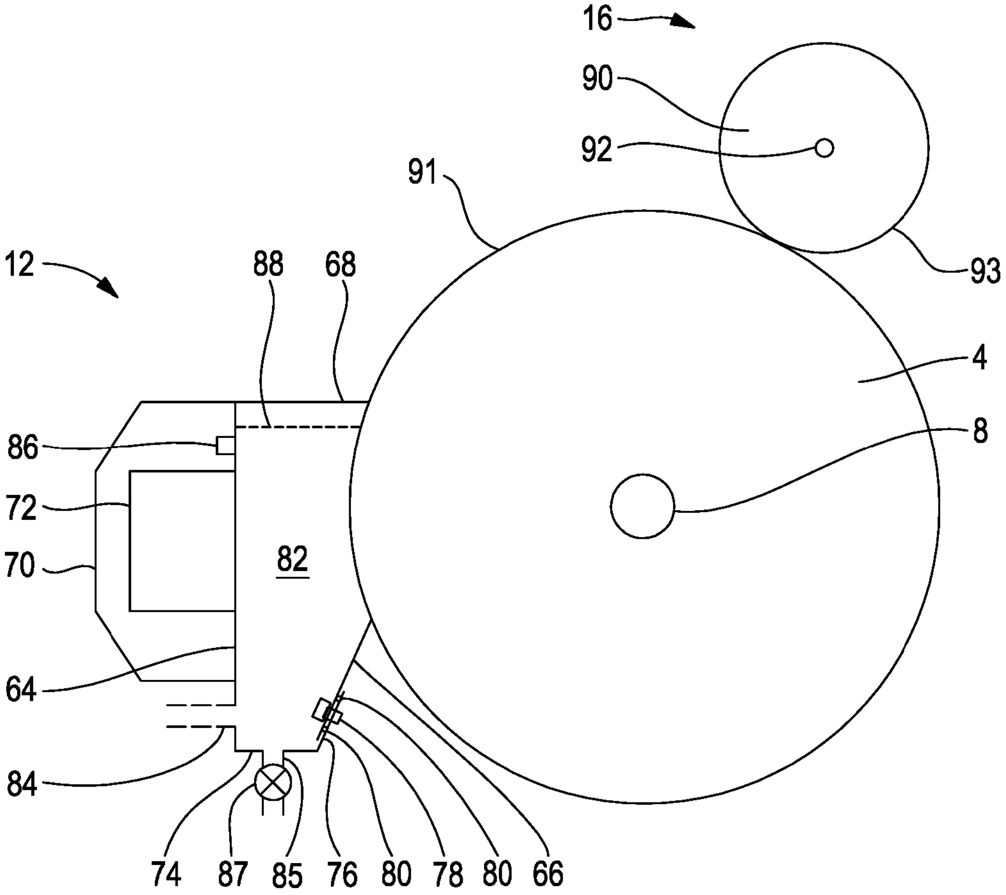
FIG. 5 is a schematic cross-sectional view of a first embodiment of an ultrasonic cleaning bar according to the present invention mounted to a roller of a printing machine.

FIG. 5 shows a schematic cross-sectional side view of the ultrasonic cleaning bar 12 in the cleaning configuration relative to the roller 4. The ultrasonic cleaning bar 12 comprises a body 64, a doctor blade 66, a pair of end caps 68, a cover member 70, and a plurality of ultrasonic transducers 72. The body 64 is generally L-shaped and defines a base 74 having a lip 76. The lip 76 extends upwardly from the base 74, and is inclined at an obtuse angle relative to the base 74. The doctor blade 66 extends generally upwards from the lip 76 so as to form a generally U-shaped channel along the longitudinal axis. The doctor blade 66 is mounted to the lip 76 by a fastener 78. The interface between the doctor blade 66 and the lip 76 is sealed by a pair of gaskets 80 such that fluid cannot leak between the doctor blade 66 and the lip 74. In alternative embodiments substantially any suitable mounting arrangement may be employed to fix the doctor blade 66 to the lip 74 in a fluid tight fashion. The doctor blade 66 engages the roller 4 when the ultrasonic cleaning bar 12 is in the cleaning configuration (as shown in FIG. 5) and forms a fluid tight seal therebetween.

The end caps 68 are positioned at longitudinally opposite ends of the ultrasonic cleaning bar 12. The end caps 68 are mounted to the body 64 and are configured to provide a fluid tight seal between the body 64, the doctor blade 66 and the roller 4. The end caps 68 are generally planar, and define a curved side edge having a corresponding radius of curvature to the roller 4. The end caps 68, body 64 and doctor blade 66 co-operate to define a trough 82 configured to contain a cleaning fluid. The body 64 comprises an inlet port 84 which is connected to the second fluid line 20 which is configured to deliver fluid to the trough 82 and an outlet port 85 and an outlet valve 87 connected to the third fluid line 22. The outlet valve 87 is preferably electronically actuable in response to a control signal from the control unit 10. The ultrasonic cleaning bar 12 further comprises a level sensor 86 configured to detect the presence of cleaning fluid within the trough 82. The level sensor 86 is positioned close to the top of the body 64, and in particular is positioned above the ultrasonic transducers 72. The level sensor may be any suitable sensor for detecting the presence of a fluid, for example an ultrasonic sensor, a contact sensor, a float sensor or the like.

During use, when the ultrasonic cleaning bar 12 is in the cleaning position, the outlet valve 87 is closed and the trough 82 is filled with cleaning fluid until it reaches the level sensor 86. The control unit 10 is configured so that the ultrasonic transducers 72 are not activated until the cleaning fluid has been detected by the level sensor 86. However, because the level sensor 86 is positioned above the ultrasonic transducers 72, the ultrasonic transducers 72 cannot be activated until they are below the free surface 88 of the cleaning fluid. This ensures that the vibrational energy produced by the ultrasonic transducers 72 is dissipated within the cleaning fluid. If the cleaning fluid is not present, the ultrasonic vibrations will be conducted away from the ultrasonic transducers 72 primarily by the body 64, which may cause damage to the body 64 and/or the ultrasonic transducers 72.

Once the cleaning operation is complete, the outlet valve 87 is opened and the cleaning fluid is emptied from the trough 82 via the outlet port 85. By maintaining the outlet valve 87 as closed during the cleaning operation, the cleaning fluid captured within the trough 82 is not flowing and therefore the vibrations produced by the by the ultrasonic transducers 72 are better able to permeate through the cleaning fluid. Furthermore, because the amount of cleaning fluid used is not more than the volume of the trough 82, and therefore cleaning of the roller 4 can be performed using a relatively small amount of fluid. The above notwithstanding, it will be appreciated that in alternative embodiments of the invention the outlet valve 87 may be open such that the cleaning fluid is constantly flowing into and out of the trough 82.

The flow of fluid through the second fluid line 20 to the trough 82 is controlled by control unit 10. In some embodiments, the control unit 10 is configured so that as soon as the level sensor 86 detects the presence of cleaning fluid, fluid flow through the second fluid line 20 is turned off, thus preventing the trough 82 from being over-filled. In alternative embodiments, the control unit 10 may be configured to wait for a predetermined period of time after the level sensor 86 detects the presence of cleaning fluid before turning off fluid flow through the second fluid line 20. This will provide additional cleaning fluid within the trough 82 to account for any accidental leakage during the cleaning operation. In other embodiments, the ultrasonic cleaning bar 12 may comprise a pair of level sensors 86 spaced vertically apart from one another, and the control unit 10 may be configured to ensure that the free surface 88 stays between the two level sensors 86. For example, when an upper one of the level sensors 86 detects the presence of cleaning fluid the fluid flow through the second fluid line 20 may be switched off, and if a lower one of the fluid sensors subsequently detects that the cleaning fluid is no longer present the fluid flow through the second fluid line 20 may be switched on.

The ultrasonic transducers 72 are spaced apart along the longitudinal axis of the ultrasonic cleaning bar 12 (i.e. from left to right in FIG. 2) and are encased by the cover member 70. The ultrasonic transducers 72 may be mounted to the body 64 in any suitable way so that when the ultrasonic transducers 72 are activated, vibrational energy from the ultrasonic transducers 72 is transferred through the body 64 and into the fluid contained in the trough 82. For example, the ultrasonic transducers 72 may each comprise a housing which is mounted to the body 64 by bonding, and may further comprise piezoelectric elements which are secured within the housing by a fastener, such as a bolt. However, substantially any suitable configuration of ultrasonic transducer may be used, provided that ultrasonic energy is can be imparted upon the fluid contained in the trough 82. The body 64 is preferably made from a metal such as stainless steel. It has been found that the use of non-metallic materials such as carbon fibre for the body 64 dampens the ultrasonic vibrations generated by the ultrasonic transducers 72, whereas the use of metal, and in particular stainless steel, in fact promotes resonance of the ultrasonic vibrations thereby enhancing the cleaning effect.

The ultrasonic transducers 72 are positioned so that they are vertically above the doctor blade 66. As such, when the trough 82 is filled with cleaning fluid, there is a large area between the roller 4 between a free surface 88 (i.e. top surface) of the cleaning fluid and the doctor blade 66 in which the cleaning fluid directly contacts the roller 4. During use, the ultrasonic vibrations permeate the cleaning fluid and impinge upon an outer surface 91 of the roller 4. Where the roller 4 is an anilox roller, the outer surface 91 of the roller 4 will comprise a plurality of engraved cells within which ink may have dried. The ultrasonic vibrations are transmitted into the cells and act to dislodge the dried ink, thus cleaning the roller 4. Preferably, the ultrasonic transducers 72 a primary vibrational frequency which is variable up to 3 kHz, and further harmonic frequencies in the range 18 to 20 kHz and 150 to 180 kHz. Due to the shape of the body 64 of the ultrasonic cleaning bar 12, the ultrasonic transducers are positioned relatively close to the outer surface 91 of the roller 4. Typically, during use the ultrasonic transducers are around 15 to 30 mm away from the outer surface 91 of the roller 4. As such, the amplitude of the ultrasonic vibrations in the cleaning fluid is still strong at the outer surface 91 of the roller 4. As such, the ultrasonic cleaning bar 12 provides improved cleaning of the roller 4.

Preferably, the ultrasonic transducers 72 are spaced apart from one another at regular intervals along the longitudinal axis. For example, the ultrasonic transducers 72 may be spaced apart by around 75 to 150 mm. However, it will be appreciated that in alternative embodiments the ultrasonic transducers 72 may be spaced apart from one another at irregular intervals. The ultrasonic transducers 72 may be operated simultaneously, or may be operated individually in a staggered fashion. As shown in FIG. 5, the roller driver 16 comprises a drive wheel 90 which is rotatable about an axle 92 under the action of a motor (not shown). The roller driver 16 is mounted to the frame of the printing machine 6 such that an outer surface 93 of the drive wheel 90 frictionally engages an outer surface 91 of the roller 4. In particular, the roller driver 16 may be mounted to the frame of the printing machine 6 via a mounting. The mounting may comprise, for example, a stud attached to the frame of the printing machine 6 and the roller driver 16 may comprise a bracket configured to connect the roller driver 16 to the stud. The mounting is preferably configured to permit the roller driver 16 to move between an engaged position and a rest position. In the engaged position, the drive wheel 90 of the roller driver 16 frictionally engages the outer surface 91 of the roller 4, and in the rest position the drive wheel 90 of the roller driver 16 is not in contact with the roller 4.

However, it will be appreciated that in alternative embodiments the roller driver 16 may be secured in any suitable manner. For example, the roller driver 16 may be mounted to a frame which is independent of the printing machine 6, so as to place the drive wheel 90 in contact with the roller 4. In some embodiments the drive wheel 90 of the roller driver 16 may define a width in the direction of the axle 92 which is relatively narrow in comparison to the roller 4 of the printing machine (such as for example a few centimetres). For example, the drive wheel 90 may have a diameter of around 100 mm and a width of around 20 to 40 mm. In general, it will be appreciated that the roller driver may have any configuration which is suitable for imparting rotation on the roller 4 by frictional contact.

During use, the motor of the roller driver is activated, causing the drive wheel 90 to rotate, and transferring rotational motion to the roller 4 via frictional contact between the outer surface 93 of the drive wheel 90 and the outer surface 91 of the roller 4. As such, the roller 4 rotates relative to the ultrasonic cleaning bar 12 about the axle 8. By rotating the roller 4, different parts of the outer surface 91 of the roller 4 come into contact with the cleaning fluid in the trough 82. The rotation of the roller 4 therefore ensures that the whole surface of the roller 4 is cleaned by the ultrasonic cleaning bar 12 after one full rotation of the roller 4. The roller 4 may be rotated in either direction about the axle 8 without affecting the ability of the doctor blade 66 to seal against the roller 4.

The outer surface 93 of the drive wheel 90 is coated with a layer of material that is soft in comparison to the material of the roller 4, and which provides good frictional contact with the outer surface 91 of the roller 4. In the present embodiment, the outer surface 93 of the drive wheel 90 comprises a 60 shore hardness rubber, however it will be appreciated that any suitable material may be used, for example a polymer material, a nitrile material, a polyurethane or the like. Because the material of the outer surface 93 of the drive wheel 90 is soft in comparison to the roller 4, this minimises the risk that the drive wheel 90 and roller 4 will damage the outer surface 91 of the roller 4.

Furthermore, because the material of the outer surface 93 of the drive wheel 90 provides good frictional contact, this minimises the risk that the drive wheel 90 will slip relative to the roller 4, which may reduce the cleaning performance.

The ultrasonic cleaning bar 12 may be used with rollers 4 of different diameters. Because the roller 4 is driven by surface contact between the outer surface 93 of the drive wheel 90 and the outer surface 91 of the roller 4, the velocity of the outer surface 91 of the roller 4 is directly controlled by the rotational input of the roller driver 16. As such, for a given rotational speed of the drive wheel 90, the outer surface 91 of the roller 4 will advance past the trough 82 of the ultrasonic cleaning bar 12 at the same rate regardless of the diameter of the roller 4. Therefore, the roller driver 16 provides the advantage that it is able to precisely control the surface velocity of the roller 4 so as to ensure that the roller 4 advances at the correct surface velocity for the cleaning operation. This avoids the need to re-program the control unit 10 when the ultrasonic cleaning system 2 is used with rollers of different sizes (for example, where the ultrasonic cleaning system 2 is used with different models of printing machine).

Figure 6:
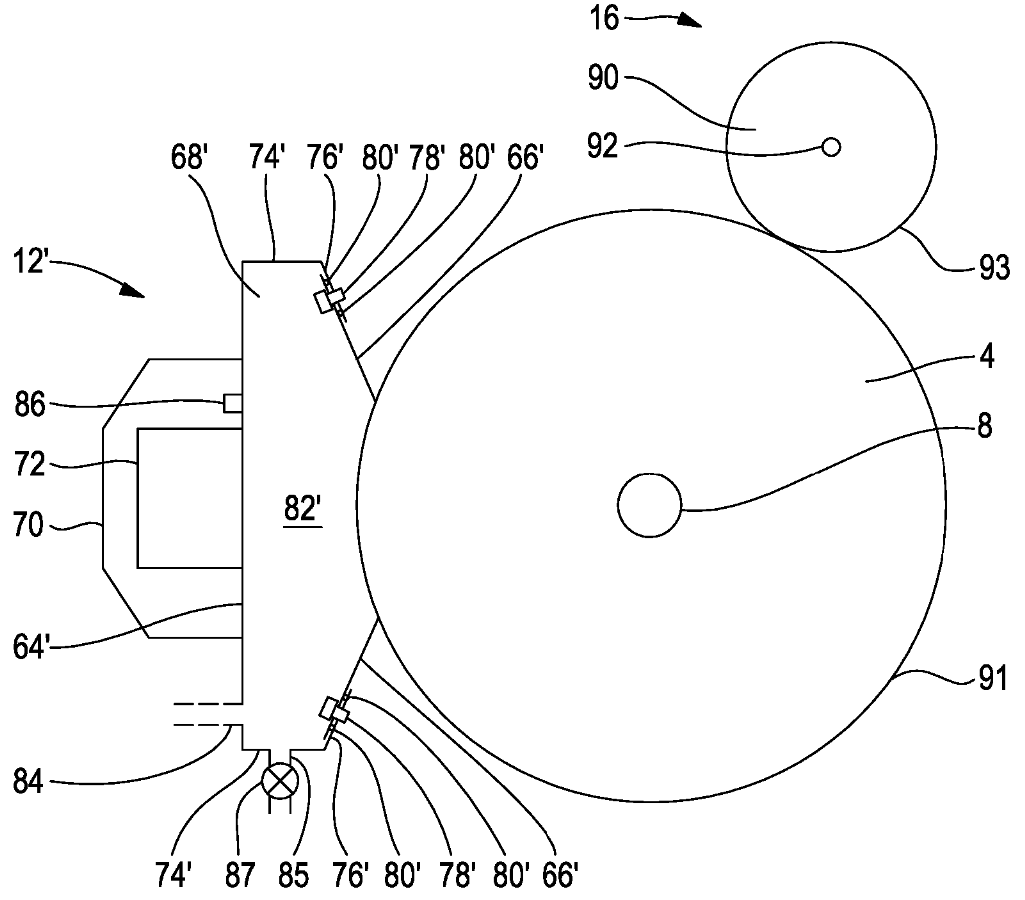
FIG. 6 is a schematic cross-sectional view of a second embodiment of an ultrasonic cleaning bar according to the present invention mounted to a roller of a printing machine.

FIG. 6 shows a second embodiment of an ultrasonic cleaning bar 12' according to the present invention. The second embodiment of the ultrasonic cleaning bar 12' differs from the first embodiment in that the ultrasonic cleaning bar comprises body 64' having a pair of longitudinally extending sides 74'. The sides 74' define a pair of longitudinally extending lips 76'. A lower one of the lips 76' extends generally upwards and a second, opposite, one of the lips 76' is extends generally downwards. The lips 76' support a pair of doctor blades 66' which face towards one another and engage the outer surface 91 of the roller 4. The doctor blades 66' are mounted to the lips 76' via fasteners 78' and sealed by sealing members 80'. The sides 74', lips 76' and doctor blades 66' co-operate to define a trough 82' therebetween. The ends of the trough 82' are sealed by end plates 68' so as to prevent leakage of fluid out of the trough. The trough 82' is therefore sealed on all sides. As such, the trough can be oriented in any direction with respect to gravity, without causing fluid leakage. This is advantageous where the geometry of the printing machine 6 is such that it would not be possible to orient the trough 82 of the first embodiment of the ultrasonic cleaning bar 12 in an upright position.

Figure 7:
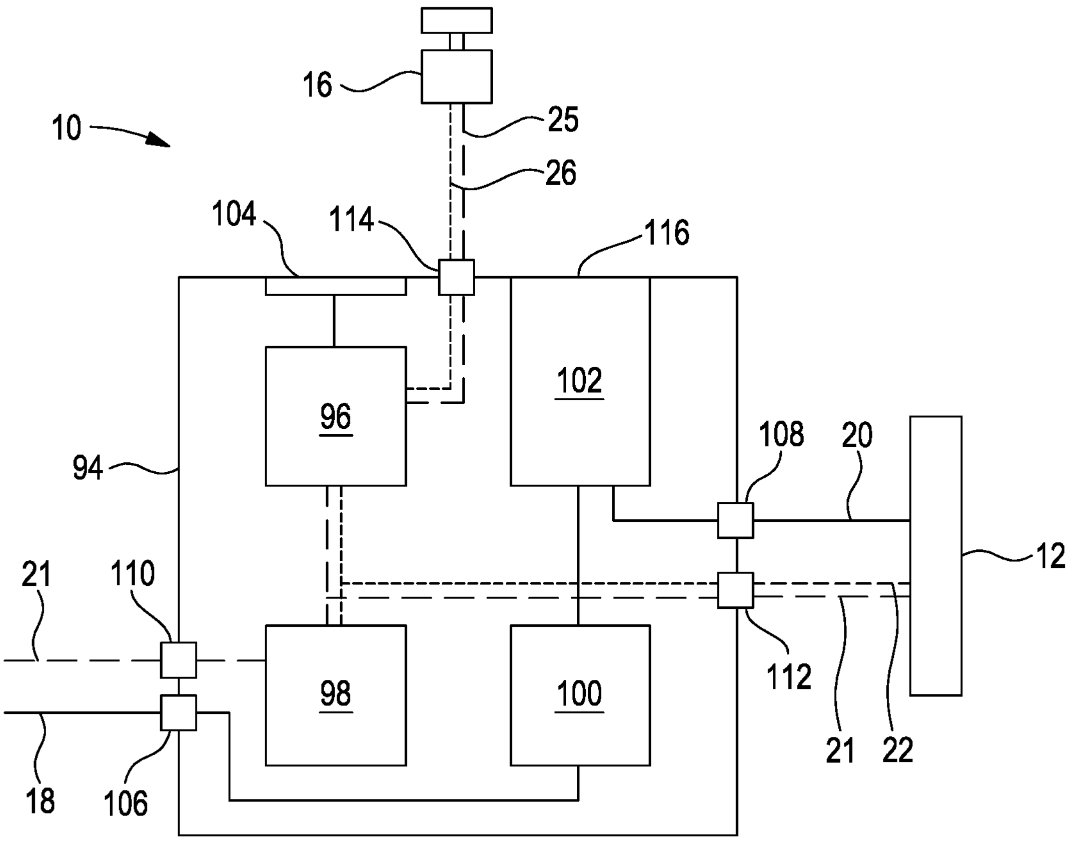
FIG. 7 is a schematic view of a control unit according to the present invention.

FIG. 7 shows a schematic view of a control unit 10 according to the present invention. The control unit 10 comprises a housing 94, a controller 96, a pulse generator 98, a heater 100, a dosing unit 102 and a user input panel 104. The housing 94 comprises a fluid inlet port 106 which is connectable to the first fluid line 18 and a fluid outlet port 108 which is connectable to the second fluid line 20. The housing 94 further comprises a power inlet socket 110 connectable to the first power line 21, a first outlet socket 112 connectable to the second power line 23 and the first communications line 24, and a second outlet socket 114 connectable to the third power line 25 and the second communications line 26.

Fluid is received by the fluid inlet port 106 and is channelled to the heater 100. Movement of the fluid is driven by the pressure of the fluid from the first fluid line 18 (i.e. the pressure of the factory water supply). However, in alternative embodiments the control unit 10 may additional comprise a pump and/or a tank for driving movement of the cleaning fluid. The control unit 10 additionally comprises a valve (not shown) for selectively permitting fluid flow to the second fluid line 20. For example, the valve may be part of or coupled to the fluid inlet port 110 and/or the fluid outlet port 112. The heater 100 is an in-line heater configured to heat the fluid as it moves. However, in alternative embodiments, the heater 100 may comprise a tank having heating elements for heating fluid contained in the tank. The heater 100 is configured to heat the fluid to around 30° C. However, in yet further embodiments the control unit 10 may not comprise a heater 100. In such embodiments, the fluid inlet port 106 may be connected directly to the dosing unit 102.

Once heated, the fluid is passed to the dosing unit 102. The dosing unit 102 introduces a predetermined amount of surfactant into the heated fluid. Typically, the amount of surfactant required is 10 ml per litre of fluid. The temperature of the heated fluid may be chosen so as to ensure that the surfactant will rapidly dissolve into the fluid so that it is evenly dissipated. Furthermore, it has been found that heating the fluid, cleaning performance is increased and dried ink is more easily dislodged. The dosing unit 102 is accessible via a door 116 of the housing 94. The door 116 permits the surfactant in the dosing unit 102 to be refilled once it has been consumed. Once the surfactant has been introduced into the cleaning fluid, the cleaning fluid is channelled out of the control unit 10 via the fluid outlet port 108 and into the trough 82 of the ultrasonic cleaning bar 12.

Electrical power is received by the power inlet socket 110 and is used to power the controller 96 and the pulse generator 98. The controller 98 communicates with the ultrasonic cleaning bar 12 via the first outlet socket 112. In particular, the controller 98 is configured to send and receive control signals from the ultrasonic transducers 72 and the level sensor 86. The controller 96 communicates with the roller driver 16 via the second outlet socket 114 and is configured to activate, deactivate and control the speed of the drive wheel 90 of the roller driver 16. The controller 96 is further configured communicate with the pulse generator 98 and the user input panel 104.

During use, once the user has mounted the ultrasonic cleaning bar 12 to the printer 6, the user inputs a "start" command to the user input panel 104. The control unit 10 then begins to fill the trough 82 with cleaning fluid via the second fluid line 20. The control unit 10 continues to fill the trough 82 until the presence of the cleaning fluid is detected by the level sensor 86. The level sensor 86 communicates that cleaning fluid has been detected to the controller 96, and subsequently the controller 96 shuts off fluid flow to the trough 82 (for example by deactivating the second fluid line 20). The controller 96 communicates with the pulse generator 98 which produces an oscillating electrical power output which drives the ultrasonic transducers 72. The frequency of the electrical power output from the ultrasonic generator 98 is chosen so as to cause the ultrasonic transducers to generate a primary vibrational frequency which is variable up to 3 kHz, and further harmonic frequencies in the range 18 to 20 kHz and 150 to 180 kHz. The control unit 10 then communicates with the roller driver 16 to cause the drive wheel 90 to rotate at a predetermined angular velocity. The roller driver 16 causes the roller 4 to rotate, thereby cleaning the whole surface of the roller 4. Typically, the roller 4 is driven so that the outer surface 91 of the roller 4 has a surface velocity of around 3 metres per minute, however this speed may be varied to any suitable speed. It has been found that a surface speed of around 3 metres per minute is fast enough that the cells of the roller 4 can be cleaned in a short amount of time, but slow enough to that the cells of the roller 4 are exposed to ultrasonic vibrations for long enough to ensure that they are cleaned.

The control unit 10 continues to drive the ultrasonic transducers 72 and the roller driver 82 until either the user inputs a "stop" command into the user input panel 104, or until a predetermined cleaning period has elapsed. The predetermined cleaning period is chosen so that the whole surface of the roller 4 has been cleaned. In particular, the predetermined cleaning period may be chosen in dependence upon the diameter of the roller 4 and the desired surface speed produced by the roller driver 16 (which may be input into the controller 96 by the user). The predetermined cleaning period may be input by the user, or may selected from a database stored by or associated with the controller 96 of the control unit 10. Typically the predetermined cleaning period is around 5, 10, 15 or 20 minutes. Once the "stop" command is received by the controller 96 or the predetermined cleaning period elapses, the controller 96 deactivates the pulse generator 98 and stops driving the ultrasonic transducers 72. The controller 96 communicates with the ultrasonic cleaning bar 12 and causes the outlet valve 87 of the ultrasonic cleaning bar 12 to open, permitting the cleaning fluid in the trough 82 to empty via the third fluid line 22.

The cleaning system 2 may be used with rollers 4 of different lengths. In order to support the ultrasonic cleaning bar 12 either side of the roller 4, the length of the ultrasonic cleaning bar 12 must be approximately the same as the length of the roller 4. As such, the cleaning system 2 may comprise ultrasonic cleaning bars 12 of various different lengths. However, in order to provide cleaning along the whole length of the roller 4, the ultrasonic transducers 72 should not be spaced apart too far. Therefore, longer ultrasonic cleaning bars 12 will require more ultrasonic transducers 72 in order to provide adequate cleaning. However, it will be appreciated that the pulse generator 96 may only be able to provide sufficient energy to power a number of ultrasonic transducers 72. Typically a single pulse generator 96 is able to supply enough electrical energy to power four pulse generators 96. As such, the control unit 10 may comprise more than one pulse generator 96. For example, the control unit 10 may comprise two, three or any suitable number of pulse generators 96. Where the control unit 10 comprises more than one pulse generator 96, it is able to provide power to ultrasonic cleaning bars 12 having more than four ultrasonic transducers 72.

Figure 8:
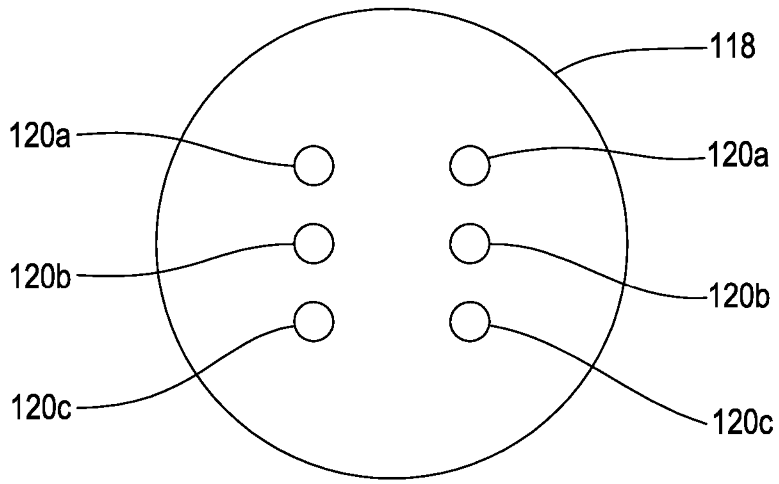
FIG. 8 is a schematic view of a plug for an ultrasonic cleaning bar according to the present invention.

With reference to FIG. 8, each ultrasonic cleaning bar 12 comprises a plug configured to be received by the first outlet socket 112. The plug 120 comprises six electrical contact pins 120*a-c* arranged in pairs. The pins 120 are received by corresponding receptacles of the first outlet socket 112 to create an electrical connection therebetween. Each pair of pins 120*a-c* comprises a first pin for feeding electrical current from the control unit 10 to the ultrasonic cleaning bar 12 and a second pin for returning the electrical current from the ultrasonic cleaning bar 12 to the control unit 10 (e.g. a "live" pin and a "neutral" pin). Each pair of pins 120*a-c* is electrically connected to four ultrasonic transducers 72. Furthermore, each pair of pins 120*a-c* is electrically powered by a separate pulse generator 96. For example, a first pair of pins 120*a* is powered by a first pulse generator 96, a second pair of pins 120*b* is powered by a second pulse generator 96 and a third pair of pins is powered by a third pulse generator 96. Because the plug 118 of FIG. 8 comprises three pairs of pins 120*a-c*, the plug 118 is able to connect the control unit 10 to an ultrasonic cleaning bar 12 comprising twelve ultrasonic transducers 72 (such as the ultrasonic cleaning bar 12 shown in FIG. 1).

In alternative embodiments each pair of pins 120*a-c* may be connected any suitable number of ultrasonic transducers 72, for example one to six ultrasonic transducers. Furthermore, the plug 118 may be used with an ultrasonic cleaning bar comprising fewer than twelve ultrasonic transducers. For example, the plug 118 may be used with an ultrasonic cleaning bar 12 comprising eight ultrasonic transducers 72. However, because each pair of pins 120*a-c* powers four ultrasonic transducers 72, all eight ultrasonic transducers 72 can be powered using only the first pair of pins 120*a* and the second pair of pins 120*b*. As such, the plug 118 may be manufactured without the third pair of pins 120*c*, or the third pair of pins 120*c* may be present but electrically disconnected from any other components. The plug 118 is therefore configured to automatically connect the correct number of pulse generators 96 to the ultrasonic transducers 72. This means that the user does not need to make any adjustments to the control unit 10 where the control unit 10 is used with different ultrasonic cleaning bars 12 having different numbers of ultrasonic transducers 72. In practice, the user is able to simply plug any ultrasonic cleaning bar 12 into the control unit 10, as the configuration of the plug 118 will ensure that the correct amount of power is drawn from the control unit 10.

The user input panel 104 may comprise one or more buttons in communication with the controller 96. Additionally or alternatively, the user input panel 104 may comprise a screen, and in particular a touch screen, configured to display a graphical user interface. The user input panel 104 provides a means for the user to adjust the parameters of the cleaning operation, for example the frequency of the electrical pulses generated by the pulse generator 98, the duration of the cleaning cycle itself, the speed of the roller driver 16 etc.

In alternative embodiments, the control unit 10 may comprise additional fluid outlet ports and outlet sockets configured to connect the control unit 10 to additional ultrasonic heating bars 12. As such, the control unit 10 can be used to control a plurality of separate ultrasonic heating bars 12. For example, a user may mount a first ultrasonic heating bar 12 to a first roller 4 of a printing machine 6 and initiate an ultrasonic cleaning cycle. Whilst the first roller 4 is being cleaned, the user may mount a second ultrasonic cleaning bar 12 to a second roller 4 of the same or a different printing machine 6. Once the cleaning cycle of the first roller 4 is complete, the user can use the control unit 10 to initiate the cleaning cycle for the second roller 4. Whilst the second roller 4 is being cleaned, the user can dismount the first ultrasonic cleaning bar 12 and mount it to a third roller 4 of the same or a different printing machine. As such, by using a plurality of ultrasonic cleaning bars 12 the user can save time when cleaning multiple rollers 4.

The invention claimed is:

1. An ultrasonic cleaning bar for cleaning a roller of a printing machine, the ultrasonic cleaning bar comprising:

an elongate body defining a longitudinal axis;

a doctor blade supported by the body;

an ultrasonic transducer for generating ultrasonic waves within the cleaning fluid; and first and second protrusions positioned at and extending from longitudinally opposite ends of the body in a direction parallel to the longitudinal axis of the ultrasonic cleaning bar, the first protrusion being releasably engageable with a first mounting bracket of the printing machine and the second protrusion being releasably engageable with a second mounting bracket of the printing machine; and wherein, when the first and second protrusions are engaged with the first and second brackets, the doctor blade engages a surface of the roller, such that the body, the doctor blade and the roller define a trough therebetween configured to contain a cleaning fluid which contacts the roller.

2. An ultrasonic cleaning bar according to claim 1, wherein:

each of the first and second protrusions is a pin.

3. An ultrasonic cleaning bar according to claim 1, wherein:

the ultrasonic cleaning bar further comprises a third protrusion and a fourth protrusion positioned at longitudinally opposite ends of the body;

the first and third protrusions are positioned at a first end of the body, and the second and fourth protrusions are positioned at a second end of the body, and the third protrusion is releasably engageable with the first mounting bracket and the second protrusion is releasably engageable with the second mounting bracket.

4. An ultrasonic cleaning bar according to claim 1, wherein:

the spacing between the ultrasonic transducer and the surface of the roller during use is no more than 30 mm.

5. An ultrasonic cleaning bar according to claim 1, wherein the ultrasonic cleaning bar further comprises a plurality of ultrasonic transducers spaced apart along the longitudinal axis.

6. An ultrasonic cleaning bar according to claim 1, wherein the ultrasonic cleaning bar further comprises a fluid inlet port and a fluid outlet port.

7. An ultrasonic cleaning bar according to claim 1, wherein:

the body defines a base, and wherein the doctor blade extends from the base to form a generally U-shaped channel.

8. An ultrasonic cleaning bar according to claim 1, wherein the ultrasonic cleaning bar comprises a sensor configured to detect the presence of the cleaning fluid within the trough.

9. An ultrasonic cleaning bar according to claim 1, wherein the ultrasonic cleaning bar further comprises an arm configured to connect to a frame of the printing machine so as to hold the ultrasonic cleaning bar in a cleaning position in relation to the roller.

10. An ultrasonic cleaning bar according to claim 1, wherein the ultrasonic cleaning bar comprises a power line for connecting the ultrasonic transducer to a control unit.

11. A printing machine cleaning system, comprising:

the ultrasonic cleaning bar according to claim 1;

a bracket assembly for mounting the ultrasonic cleaning bar to the printing machine, wherein the ultrasonic cleaning bar is releasably engageable with the bracket assembly; and a control unit fluidly and electrically connected to the ultrasonic cleaning bar, the control unit being configured to control the supply of a cleaning fluid to the ultrasonic cleaning bar and comprising a pulse generator configured to supply an oscillating electrical current to the ultrasonic cleaning bar for driving an ultrasonic transducer of the ultrasonic cleaning bar.

12. A printing machine cleaning system according to claim 11, wherein:

the system further comprises a roller driver configured to engage an outer surface of the roller, the control unit being configured to communicate with the roller driver.

13. The ultrasonic cleaning bar according to claim 1, wherein:

the first and second protrusions are co-linear.

14. The ultrasonic cleaning bar according to claim 3, wherein the third and fourth protrusions are co-linear.

15. The ultrasonic cleaning bar according to claim 5, wherein the ultrasonic transducers are spaced apart from one another by no more than 150 mm.

16. The ultrasonic cleaning bar according to claim 6, wherein the ultrasonic cleaning bar further comprises an outlet valve configured to selectively permit fluid flow out of the fluid outlet port.

17. The ultrasonic cleaning bar according to claim 1, wherein:

the doctor blade is a first doctor blade and the ultrasonic cleaning bar comprises a second doctor blade configured to engage the surface of the roller, wherein the first doctor blade is positioned on a first side of the body and the second doctor blade is positioned on a second side of the body opposite the first side of the body.

18. The ultrasonic cleaning bar according to claim 8, wherein the sensor is positioned vertically above the ultrasonic transducer.

19. The ultrasonic cleaning bar according to claim 9, wherein the power line comprises a plug configured to connect to the control unit, the plug being configured to selectively draw an amount of power from the control unit which corresponds to the number of ultrasonic transducers of the ultrasonic cleaning bar.

20. A printing machine cleaning system according to claim 11, wherein:

the control unit further comprises a controller configured to control the pulse generator.

21. An ultrasonic cleaning bar bracket assembly for a printing machine, wherein the bracket assembly comprises first and second brackets for mounting either end of a roller, wherein each bracket comprises a first formation and a second formation, the first and second formations being configured to releasably engage corresponding formations of the ultrasonic cleaning bar, wherein the first formation of each bracket defines an upper channel and the second formation of each bracket defines a lower channel, each of the upper and lower channels being configured to receive a corresponding protrusion of the ultrasonic cleaning bar.

22. A bracket assembly according to claim 21, wherein:

the first and second formations of the second bracket are a mirror image of the first and second formations of the first bracket.

23. A bracket assembly according to claim 21, wherein the upper and lower channels define a generally U-shaped recess having a neck through which the formations of the ultrasonic cleaning bar are received.

24. The bracket assembly according to claim 21, wherein:

the first and second brackets each comprise a through hole for receiving a fastener.

25. The bracket assembly according to claim 21, wherein the upper and lower channels define end faces configured to engage the corresponding formations of the ultrasonic cleaning bar.

26. The bracket assembly according to claim 23, wherein the end faces of the upper and lower channels are generally parallel to a longitudinal axis of the ultrasonic cleaning bar, and wherein each of the first and second brackets further comprises a front surface perpendicular to the longitudinal axis of the ultrasonic cleaning bar.

* * * * *